UNITED STATES PATENT OFFICE.

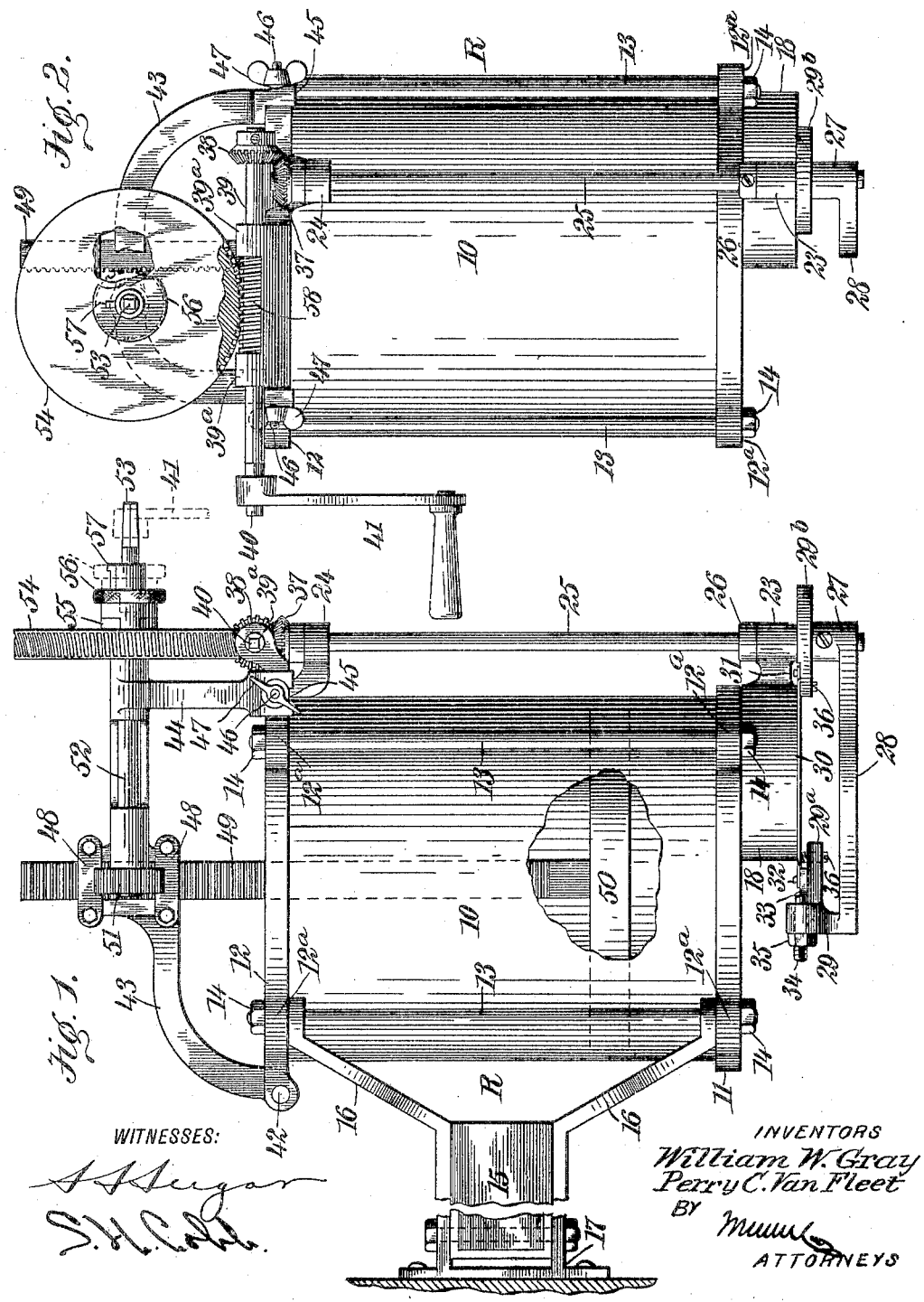

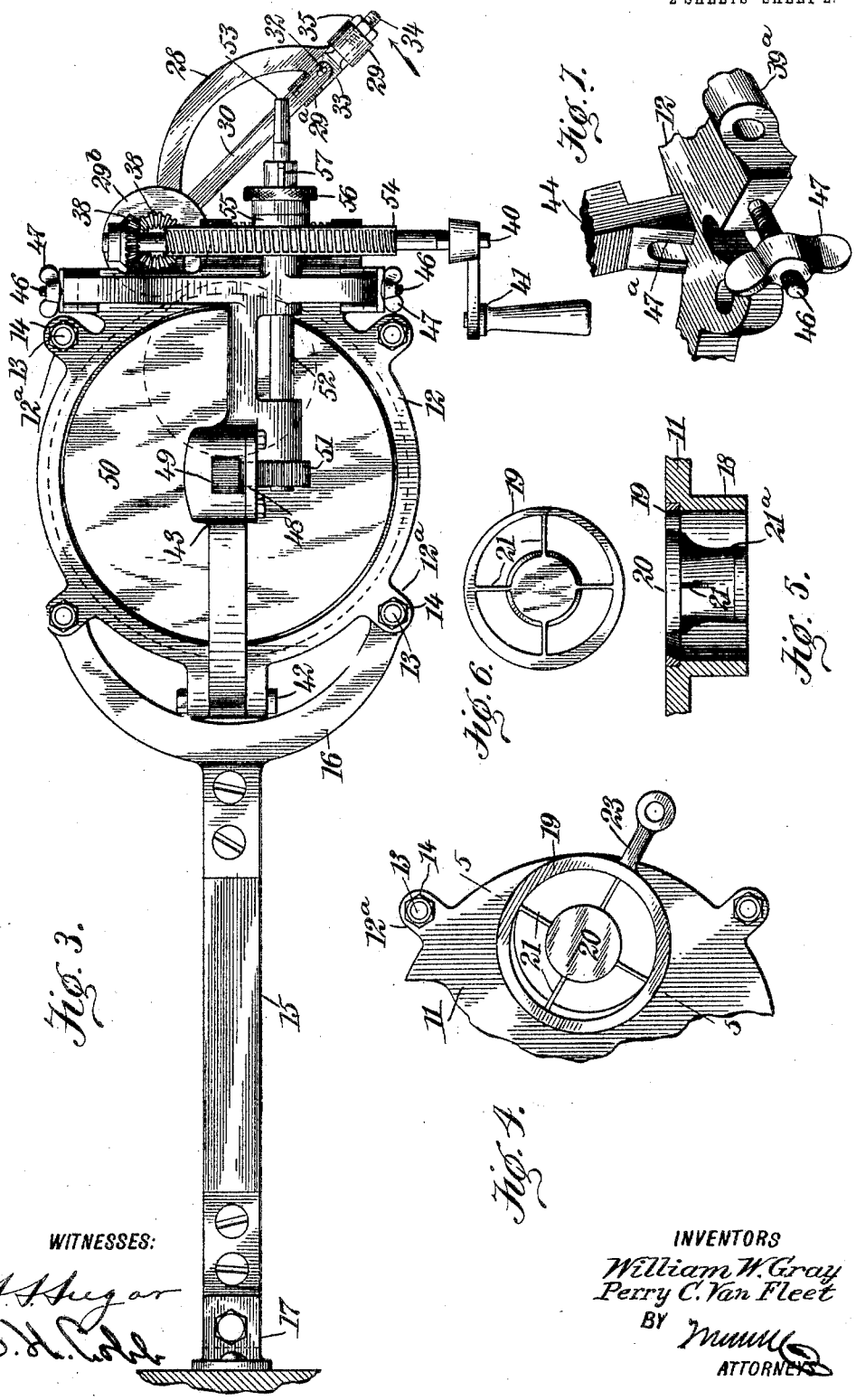

WILLIAM WHITHAM GRAY AND PERRY CORNELIUS VAN FLEET, OF RIVERSIDE, CALIFORNIA.

DOUGHNUT-MACHINE.

No. 802,207.        Specification of Letters Patent.        Patented Oct. 17, 1905.

Application filed October 22, 1904. Serial No. 229,565.

*To all whom it may concern:*

Be it known that we, WILLIAM WHITHAM GRAY and PERRY CORNELIUS VAN FLEET, citizens of the United States, and residents of Riverside, in the county of Riverside and State of California, have invented a new and Improved Doughnut-Machine, of which the following is a full, clear, and exact description.

Our invention relates to apparatus for forming dough into rings to produce doughnuts. As these are ordinarily cut out from a sheet in the presence of free flour to prevent sticking, the dough between the cut rings is rolled over and again cut, resulting in a product becoming more and more tough as this operation continues. Moreover, the loose flour collects in the frying-fat and soon burns, thickening it so that it must be frequently strained, and often spoiling it completely. To obviate such difficulties are the principal objects of our invention.

Reference is to be had to the accompanying drawings, forming a part of this specification, in which similar characters of reference indicate corresponding parts in all the figures.

Figure 1 is a side elevation of one embodiment of the invention, parts being broken away. Fig. 2 is a broken end elevation thereof. Fig. 3 is a top plan view. Fig. 4 is a broken bottom plan view, showing the discharge-opening. Fig. 5 is a vertical sectional detail on the line 5 5 of Fig. 4. Fig. 6 is a top plan view of the die-ring; and Fig. 7 is a broken detail in perspective, showing the manner of attaching the pivoted frame to the receptacle.

R designates a receptacle which may be formed of a cylindrical casing 10, at one extremity of which is a head 11 and at the opposite end a rim 12, said head and rim being shown as provided with suitably-spaced perforated lugs 12ª, through which pass threaded rods 13, nuts 14 upon the ends of these rods serving to clamp the parts together. The receptacle may be conveniently supported upon an arm 15 of any desired length, having at its outer end opposite brackets 16 16, which have openings to receive adjacent rods of the receptacle, while at the inner end this arm is preferably pivoted upon a suitable support 17. In the head is an opening situated at one side of the axis of the cylinder and surrounded by a depending flange 18. Mounted in a recess at the inner edge of this opening is a die-ring 19, the opening through which is preferably circular to give a similar contour to the dough passing through it. Within this die-ring is supported a core 20, preferably by thin arms 21, the opening between the core and die-ring being annular, save where it is broken by these arms, which on account of their slight thickness do not permanently divide the dough which meets and is pressed into a continuous ring by its contact with the inner wall of the flange and the outer surface of a depending portion 21ª of the core. The side of the die-ring toward the axis of the receptacle is shown as inclined inwardly, so that the space between it and the core is narrower than that of the opposite side.

In a bracket 23, which, as illustrated, projects from the outer side of the flange 18, and in a bracket 24, extending from the rim 12, is journaled a shaft 25, supported by a collar 26. Upon the lower extremity of this shaft is fixed the hub 27 of a curved arm 28, which has at its outer end an upward projection 29, from which is an extension 29ª toward the hub. The hub of the arm may be provided with a circular enlargement 29ᵇ, upon which is fixed a knife 30 by a suitable pin 31, said knife at its opposite end engaging a projection 32 upon a movable member 33 and forming a chord for the arm. This member slides upon the upper face of the extension 29ª and is adjustable thereon by means of a threaded shank 34, operating through an opening in the projection 29 and movable by a nut 35, which contacts with the outer face of the projection. Threaded through the hub enlargement and the extension 29ª beneath the knife are set-screws 36, which are situated upon the side of the supporting-line of the knife, or that in which the pins lie, which is toward the knife-edge, this permitting it to be adjusted into close proximity with the lower face of the flange 18 to insure a clean cut.

At the upper extremity of the shaft 25 is fixed a bevel-gear 37, which meshes with a similar gear 38 upon a shaft 39, journaled in brackets 39ª, formed upon the rim 12. One end of this shaft is squared at 40 to receive a suitable operating-crank 41.

Pivoted at 42 upon the rim is a frame 43, from which depend portions 44, divided at their outer ends at 45. These ends straddle screws 46, projecting from the edge of the rim, and the frame may be clamped in position by binding-nuts 47, movable into contact with inclined faces 47$^a$ upon the depending portions. Mounted for reciprocation in guides 48, carried by the frame, is a rack-bar 49, at the lower end of which is fixed a plunger 50, operating within the receptacle and conforming to its cylindrical side walls. With the rack meshes a pinion 51, fast upon a shaft 52, journaled in the frame and having its outer end squared at 53 to permit engagement by the crank 41. Mounted to turn freely upon this shaft 52 is a worm-wheel 54, having upon its hub one member 55 of a jaw-clutch, the companion member 56 of which is connected with the shaft by a spline 57 to move longitudinally into or out of engagement with the member 55. With the worm-wheel coöperates a worm 58, carried by the shaft 39.

In using the machine the top frame is turned back upon its hinges after loosening the binding-nuts and a mass of dough placed within the receptacle. The rack-bar being raised, the frame is then swung down and locked in position upon the rim, the plunger assuming a position within the cylinder. The crank is then placed upon the shaft 52 and this rotated (the clutch being disengaged) to lower the plunger until the dough appears through the opening in the bottom of the receptacle, this application of the crank furnishing high-speed gearing for securing the proper initial relation of the parts. This having been done, the crank is transferred to the shaft 39. The rotation of this slowly lowers the plunger through the low-speed worm-gearing to force the dough through the die-opening, and simultaneously and in the proper timing rotates the knife across the flange, separating the end of the cylinder of dough, which is forced through the die by the plunger, the space between the knife and its arm and the curved form of the latter permitting this. There is a tendency for a greater quantity of the material to flow through the side of the opening toward the axis of the receptacle than at the outer side; but this is counteracted and the rings maintained of uniform thickness by the narrowing of the opening, as has been previously described. As these pieces are cut they may drop directly into the fat or are received upon a suitable sheet placed below the machine. After the entire charge has been operated upon the plunger may be raised by placing the crank upon the shaft 52, the frame turned back, and the operation repeated, as has just been described.

It will be seen that our improved machine is exceedingly simple and that a comparatively inexperienced person may operate it as effectively as a skilled baker. It requires but little space, forms each doughnut of uniform size, and works an entire batch without the production of scrap. Moreover, it is unnecessary to use loose flour to prevent sticking, and thus the fouling of the fat is avoided.

Having thus described our invention, we claim as new and desire to secure by Letters Patent—

1. In a doughnut-machine, the combination with a receptacle having an opening provided with a core, the opening being constricted at one side of the core, of a rotatable knife operating across the opening.

2. In a doughnut-machine, the combination with a receptacle having a bottom opening at one side of its axis and being provided with a core, said opening being contracted at the side of the core toward the axis, of a rotatable knife operating across the opening.

3. In a doughnut-machine, the combination with a receptacle having a bottom opening at one side of its axis and being provided with a core, said opening being contracted at the side of the core toward the axis and having an outwardly-inclined wall below the contracted side, and a rotatable knife operating across the opening.

4. In a doughnut-machine, the combination with a cylinder, of a head at one end provided with an opening, a knife operating across the opening, and gearing for the knife pivotally mounted upon the opposite end of the cylinder.

5. In a doughnut-machine, the combination with a cylinder, of a head at one end provided with an opening, a knife operating across the opening, gearing for the knife pivotally mounted upon the opposite end of the cylinder, and a plunger movable within the cylinder and being mounted with and operated by the gearing.

6. The combination with a receptacle having an opening, of an arm movable adjacent to the opening and having extensions at opposite sides thereof, a knife secured to one of the extensions at one side of the plane of the arm, and a threaded member coöperating with the other extension and with the knife.

7. The combination with a receptacle having an opening, of an arm movable adjacent to the opening and having extensions at opposite sides thereof, a knife supported by the extensions at one side of the plane of the arm, and a screw threaded through one of the extensions and contacting with the knife.

8. The combination with a receptacle having an opening, of an arm movable adjacent to the opening, a knife supported upon the arm, and screws threaded through the arm and contacting with the side of the knife.

9. The combination with a cylinder, of a head situated at one end of the cylinder and having an opening, a rim located at the opposide end, said head and rim being separable from the cylinder, rods connecting the head and rim and serving to retain them in coaction with the cylinder, a knife mounted upon the head, and gearing for the knife carried by the rim.

In testimony whereof we have signed our names to this specification in the presence of two subscribing witnesses.

WILLIAM WHITHAM GRAY.
    PERRY CORNELIUS VAN FLEET.

Witnesses:
 W. E. Cox,
 GEO. A. SARLES.